United States Patent
De Man et al.

(10) Patent No.: US 8,588,494 B2
(45) Date of Patent: Nov. 19, 2013

(54) SYSTEM AND METHOD FOR MATERIAL DECOMPOSITION OPTIMIZATION IN IMAGE DOMAIN

(75) Inventors: Bruno Kristiaan Bernard De Man, Clifton Park, NY (US); Jiang Hsieh, Brookfield, WI (US); Naveen Chandra, Kenosha, WI (US); Jed Douglas Pack, Glenville, NY (US); Jiahua Fan, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 406 days.

(21) Appl. No.: 12/915,195

(22) Filed: Oct. 29, 2010

(65) Prior Publication Data

US 2012/0106816 A1    May 3, 2012

(51) Int. Cl.
| | |
|---|---|
| *G06K 9/00* | (2006.01) |
| *A61B 6/00* | (2006.01) |
| *G01N 23/00* | (2006.01) |
| *G21K 1/12* | (2006.01) |
| *H05G 1/60* | (2006.01) |

(52) U.S. Cl.
USPC .............................. 382/131; 378/18; 378/901

(58) Field of Classification Search
None
See application file for complete search history.

(56) References Cited

U.S. PATENT DOCUMENTS

| 6,754,298 B2 | 6/2004 | Fessler |
| 7,760,848 B2 | 7/2010 | DeMan et al. |
| 2008/0063135 A1 * | 3/2008 | DeMan et al. .................... 378/4 |

OTHER PUBLICATIONS

Schlomka et al., "Experimental feasibility of multi-energy photon0counting K-edge imaging in pre-clinical computed tomography", Jul. 8, 2008, Physics in Medicine adn Biology, vol. 53, p. 4031-4047.*
Granton et al., "Implementaiton of dual- and triple-energy cone-beam micro-CT for postreconstruction material decomposition", Oct. 16, 2008, International Journal of Medical Physics Research and Practice, vol. 35, iss. 11, p. 5030-5042.*
Laidlaw et al., "Partial-volume Bayesian classification of material mixtures in MR volume data using voxel histograms", Feb. 1998, IEEE Transactions on Medical Imaging, vol. 17, iss. 1, p. 74-86.*
Pertersilka et al., "Technical principles of dual source CT", Dec. 2008, European Journal of Radiology, vol. 68, iss. 3, p. 362-368.*
MaaB et al., "Image-based dual energy CT using optimized precorrection functions: A practical new approach of material decomposition in image domain", Jul. 24, 2009, Medical Physics, vol. 36, No. 8, p. 3818-3829.*

(Continued)

*Primary Examiner* — Stephen R Koziol
*Assistant Examiner* — Timothy Choi
(74) *Attorney, Agent, or Firm* — Ziolkowski Patent Solutions Group, SC (57) ABSTRACT

A system and method for material decomposition optimization in the image domain include a non-transitory computer readable medium has stored thereon a sequence of instructions which, when executed by a computer, causes the computer to access a reconstructed basis material image. For a first voxel of the reconstructed basis material image, the instructions also cause the computer to optimize a concentration of a pair of materials (a,b) in the first voxel exclusively in the image domain and based on a first probability based on random perturbations and a second probability based on random perturbations. The optimization is further based on a third probability based on known materials and a fourth probability based on concentrations of the pair of materials in a pair of voxels neighboring the first voxel.

20 Claims, 8 Drawing Sheets

(56) References Cited

OTHER PUBLICATIONS

Kalendar et al., "An Algorithm for Noise suppression in Dual Energy CT Material Density Images", Sep. 3, 1988, IEEE Transactions on Medical Imaging, vol. 7, No. 3, p. 218-224.*

Salem et al., "Bayesian tomogrpahic reconstruction of microsystems", Jul. 13, 2007, American Institute of Physics Conference Proceedings, vol. 954, p. 372-380.*

Menvielle et al., "Reduction of Beam-Hardening Artifacts in X-ray CT", Sep. 4, 2005, IEEE Proceedings of Engineering in Medicine and Biology 27th Annual Conference, p. 1865-1868.*

Bouman et al., "A unified approach to statistical tomography using coordinate descent optimization", Mar. 3, 1996, IEEE Transactions on Image Processing, vol. 5, No. 3, p. 480-492.*

* cited by examiner

SYSTEM AND METHOD FOR MATERIAL DECOMPOSITION OPTIMIZATION IN IMAGE DOMAIN

BACKGROUND

Embodiments of the invention relate generally to diagnostic imaging and, more particularly, to a system and method of material decomposition optimization in the image domain.

Typically, in computed tomography (CT) imaging systems, an x-ray source emits a fan-shaped or cone-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis, which ultimately produces an image.

Generally, the x-ray source and the detector array are rotated about the gantry within an imaging plane and around the subject. X-ray sources typically include x-ray tubes, which emit the x-ray beam at a focal point. X-ray detectors typically include an anti-scatter grid or collimator for rejecting scattered x-rays at the detector, a scintillator for converting x-rays to light energy adjacent the collimator, and photodiodes for receiving the light energy from the adjacent scintillator and producing electrical signals therefrom. Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data processing system for image reconstruction.

A CT imaging system may include an energy sensitive (ES), multi-energy (ME), and/or dual-energy (DE) CT imaging system that may be referred to as an ESCT, MECT, and/or DECT imaging system, in order to acquire data for material decomposition or effective Z or monochromatic image estimation. ESCT/MECT/DECT provides energy discrimination. For example, in the absence of object scatter, the system derives the material attenuation at any energy based on the signal from two relative regions of photon energy from the spectrum: the low-energy and the high-energy portions of the incident x-ray spectrum. In a given energy region relevant to medical CT, two physical processes dominate the x-ray attenuation: (1) Compton scatter and the (2) photoelectric effect. These two processes are sensitive to the photon energy and hence each of the atomic elements has a unique energy sensitive attenuation signature. Therefore, the detected signals from two energy regions provide sufficient information to resolve the energy dependence of the attenuation of the material being imaged. Furthermore, detected signals from the two energy regions provide sufficient information to determine material attenuation coefficients in terms of Compton scatter and photoelectric effect. Alternatively, the material attenuation may be expressed as the relative composition of two hypothetical materials. As understood in the art, using a mathematical change of basis, energy sensitive attenuation can be expressed in terms of two base materials, densities, effective Z number, or as two monochromatic representations having different keV. In some cases, such as in the presence of materials with K-edges in their attenuation profile, more than two basis functions may be preferred.

Such systems may use a direct conversion detector material in lieu of a scintillator. One of the ESCT, MECT, and/or DECT imaging systems in an example is configured to be responsive to different x-ray spectra. Energy sensitive detectors may be used such that each x-ray photon reaching the detector is recorded with its photon energy. One technique to acquire projection data for material decomposition includes using energy sensitive detectors, such as a CZT or other direct conversion material having electronically pixelated structures or anodes attached thereto. However, such systems typically include additional cost and complexity of operation in order separate and distinguish energy content of each received x-ray photon.

In an alternative, a conventional scintillator-based third-generation CT system may be used to provide energy sensitive measurements. Such systems may acquire projections sequentially at different peak kilovoltage (kVp) operating levels of the x-ray tube, which changes the peak and spectrum of energy of the incident photons comprising the emitted x-ray beams. A principle objective of scanning with two distinctive energy spectra is to obtain diagnostic CT images that enhance information (contrast separation, material specificity, etc.) within the image by utilizing two scans at different polychromatic energy states.

One technique has been proposed to achieve energy sensitive scanning including acquiring two scans at, for instance, 80 kVp and 140 kVp. The two scans may be obtained (1) back-to-back sequentially in time where the scans require two rotations of the gantry around the subject that may be hundreds of milliseconds to seconds apart, (2) interleaved as a function of the rotation angle requiring one rotation around the subject, or (3) using a two tube/two detector system with the tubes/detectors mounted ~90 degrees apart, as examples.

One known method for material decomposition image reconstruction reconstructs a material basis image based on iterations back and forth between the image and sinogram domains.

It would be desirable to design a system and method for optimizing material decomposition exclusively in the image domain.

BRIEF DESCRIPTION

According to an aspect of the invention, a non-transitory computer readable medium has stored thereon a sequence of instructions which, when executed by a computer, causes the computer to access a reconstructed basis material image. For a first voxel of the reconstructed basis material image, the instructions also cause the computer to optimize a concentration of a pair of materials (a,b) in the first voxel exclusively in the image domain and based on a first probability based on random perturbations and a second probability based on random perturbations. The optimization is further based on a third probability based on known materials and a fourth probability based on concentrations of the pair of materials in a pair of voxels neighboring the first voxel.

According to another aspect of the invention, a method comprises selecting a first voxel of a reconstructed multi-spectral image, the first voxel comprising a concentration of a first material (a) and a concentration of a second material (b). The method also comprises optimizing the concentrations of the first and second materials entirely in the imaging domain based on a first random perturbation probability ($Pr\_H(a,b)$), a second random perturbation probability ($Pr\_L(a,b)$), a known material probability ($Pr1(a,b)$), and a neighboring voxel probability (Pr2(a,b)) based on concentrations of the first and second materials in a second of voxel and in a third voxel, wherein the second and third voxels are adjacent to the first voxel.

According to yet another aspect of the invention, a CT system comprises a rotatable gantry having an opening to receive an object to be scanned, a high frequency electromagnetic energy projection source configured to project a high frequency electromagnetic energy beam toward the object, and a detector configured to detect high frequency electromagnetic energy passing through the object, wherein the detector comprises a plurality of detector cells configured to output signals indicative of the detected high frequency electromagnetic energy. A data acquisition system (DAS) is connected to the detector and is configured to receive the output signals, and an image reconstructor is connected to the DAS and is configured to reconstruct an image of the object from the output signals received by the DAS. The CT system also comprises a computer programmed to cause the image reconstructor to reconstruct a basis material image from multi-energy data output to the DAS from the detector and, only in the image domain, to optimize a concentration of a plurality of materials (a,b) in each of a plurality of voxels of the reconstructed basis material image based on a pair of random perturbation probabilities, based on a possible physical material probability, and based on a neighboring voxel probability of concentrations of the pair of materials in a plurality of voxels neighboring the voxel.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Diagnostics devices comprise x-ray systems, magnetic resonance (MR) systems, ultrasound systems, computed tomography (CT) systems, positron emission tomography (PET) systems, ultrasound, nuclear medicine, and other types of imaging systems. Applications of x-ray sources comprise imaging, medical, security, and industrial inspection applications. However, it will be appreciated by those skilled in the art that an implementation is applicable for use with single-slice or other multi-slice configurations. Moreover, an implementation is employable for the detection and conversion of x-rays. However, one skilled in the art will further appreciate that an implementation is employable for the detection and conversion of other high frequency electromagnetic energy.

The operating environment of embodiments of the invention is described with respect to a sixty-four-slice computed tomography (CT) system. However, it will be appreciated by those skilled in the art that embodiments of the invention are equally applicable for use with other multi-slice configurations. Moreover, embodiments of the invention will be described with respect to the detection and conversion of x-rays. However, one skilled in the art will further appreciate that embodiments of the invention are equally applicable for the detection and conversion of other high frequency electromagnetic energy. Embodiments of the invention will be described with respect to a "third generation" CT scanner, but is equally applicable with other CT systems.

An MECT system and method is disclosed. Embodiments of the invention support the acquisition of both anatomical detail as well as tissue characterization information for medical CT, and for components within luggage. Energy discriminatory information or data may be used to reduce the effects of beam hardening and the like. The system supports the acquisition of tissue discriminatory data and therefore provides diagnostic information that is indicative of disease or other pathologies. This detector can also be used to detect, measure, and characterize materials that may be injected into the subject such as contrast agents and other specialized materials by the use of optimal energy weighting to boost the contrast of iodine and calcium (and other high atomic or materials). Contrast agents can, for example, include iodine that is injected into the blood stream for better visualization. For baggage scanning, the effective atomic number generated from energy sensitive CT principles allows reduction in image artifacts, such as beam hardening, as well as provides addition discriminatory information for false alarm reduction.

Figure 1:
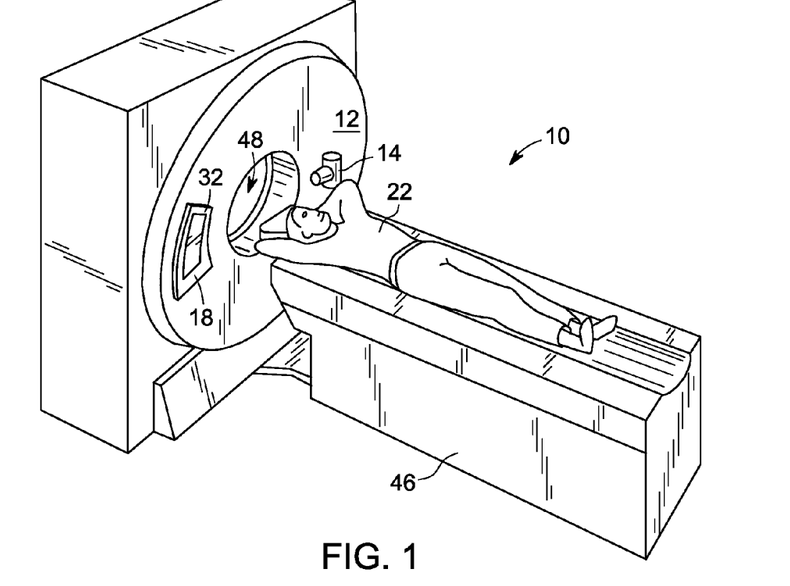
FIG. 1 is a pictorial view of a CT imaging system.
Figure 2:
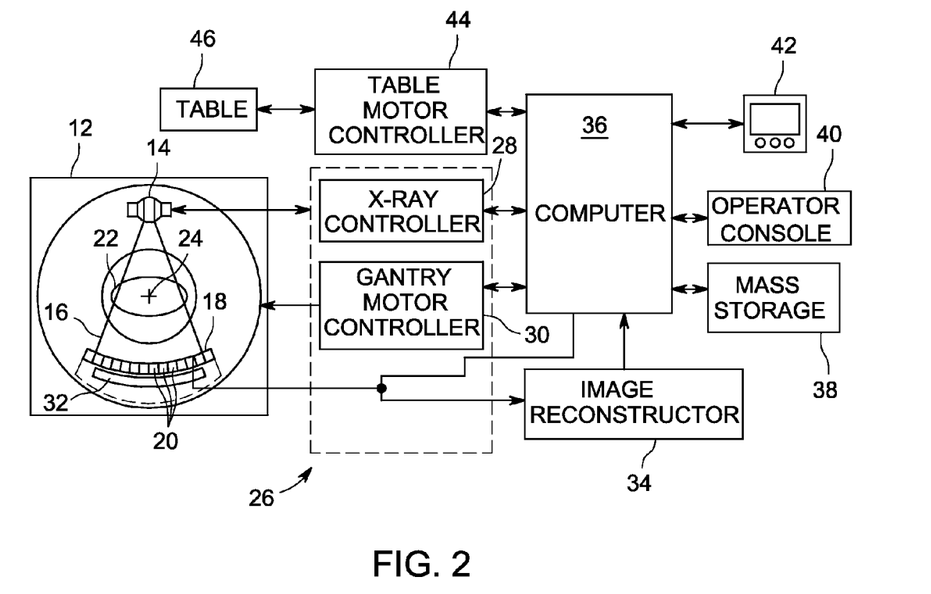
FIG. 2 is a block schematic diagram of the system illustrated in FIG. 1.

Referring to FIG. 1, a computed tomography (CT) imaging system 10 is shown as including a gantry 12 representative of a "third generation" CT scanner. Gantry 12 has an x-ray source 14 that projects a beam of x-rays toward a detector assembly 18 on the opposite side of the gantry 12. Referring now to FIG. 2, detector assembly 18 is formed by a plurality of detectors 20 and data acquisition systems (DAS) 32. The plurality of detectors 20 sense the projected x-rays 16 that pass through a medical patient 22, and DAS 32 converts the data to digital signals for subsequent processing. Each detector 20 produces an analog electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves patients 22 through a gantry opening 48 of FIG. 1 in whole or in part.

Figure 3:
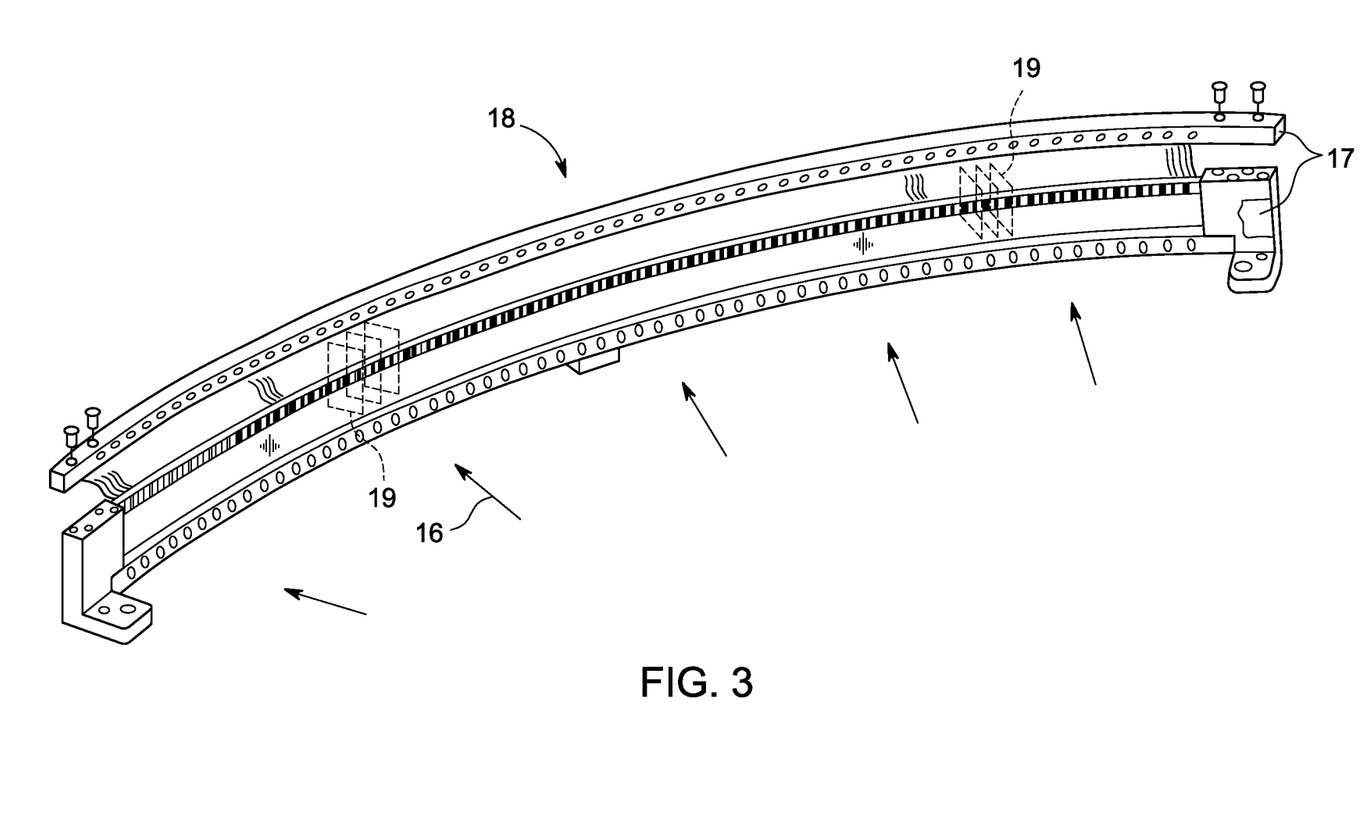
FIG. 3 is a perspective view of one embodiment of a CT system detector array.

As shown in FIG. 3, detector assembly 18 includes rails 17 having anti-scatter or collimating blades or plates 19 placed therebetween. Plates 19 are positioned to collimate x-rays 16 before such beams impinge upon, for instance, detector 20 of FIG. 4 positioned on detector assembly 18. In one embodiment, detector assembly 18 includes 57 detectors 20, each detector 20 having an array size of 64×16 of pixel elements 50. As a result, detector assembly 18 has 64 rows and 912 columns (16×57 detectors) which allows 64 simultaneous slices of data to be collected with each rotation of gantry 12.

Figure 4:
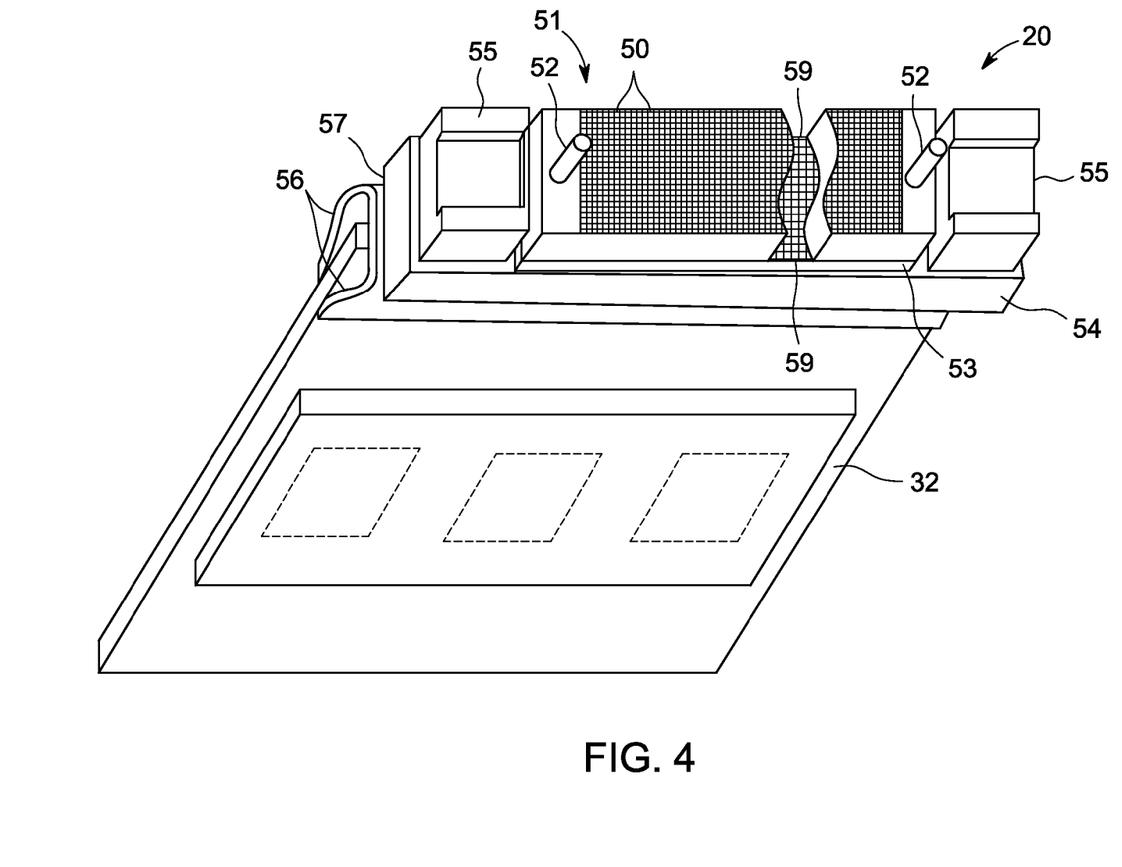
FIG. 4 is a perspective view of one embodiment of a detector.

Referring to FIG. 4, detector 20 includes DAS 32, with each detector 20 including a number of detector elements 50 arranged in pack 51. Detectors 20 include pins 52 positioned within pack 51 relative to detector elements 50. Pack 51 is positioned on a backlit diode array 53 having a plurality of diodes 59. Backlit diode array 53 is in turn positioned on multi-layer substrate 54. Spacers 55 are positioned on multi-layer substrate 54. Detector elements 50 are optically coupled to backlit diode array 53, and backlit diode array 53 is in turn electrically coupled to multi-layer substrate 54. Flex circuits 56 are attached to face 57 of multi-layer substrate 54 and to DAS 32. Detectors 20 are positioned within detector assembly 18 by use of pins 52.

In the operation of one embodiment, x-rays impinging within detector elements 50 generate photons which traverse pack 51, thereby generating an analog signal which is detected on a diode within backlit diode array 53. The analog signal generated is carried through multi-layer substrate 54, through flex circuits 56, to DAS 32 wherein the analog signal is converted to a digital signal.

Generally, in MECT or DECT, multiple sets of measurements are acquired at different respective mean energies. This provides more information to resolve the energy-dependence of the attenuation process and thereby enhance contrast between different materials, virtually emphasize or eliminate some specific materials, and eliminate artifacts induced due to spectral shifts (beam hardening). In particular, MECT may be used, for example, to acquire data at high, low, and intermediate x-ray tube voltages. MECT can also be desirable in the case where more than 3 independent energy basis functions are present and need to be discerned, such as in the presence of materials with K-edges.

The measurements at two different energy spectra $S_L(E)$ and $S_H(E)$ are given by:

$$I_L = \int S_L(E) \exp(-\int \mu(r,E)dr)dE$$

$$I_H = \int S_H(E) \exp(-\int \mu(r,E)dr)dE \quad \text{(Eqn. 1)}$$

where $\mu$ is the linear attenuation coefficient at energy E and location r.

Typically, $\mu$ is decomposed into two (or more) basis materials:

$$\mu(r,E) = a(r)A(E) + b(r)B(E) \quad \text{(Eqn. 2)}$$

where $a(r)$ and $b(r)$ are the spatially varying coefficient, and $A(E)$ and $B(E)$ are the energy dependencies of the respective basis materials.

Similarly, the line integral of the attenuation can be decomposed as:

$$\int \mu(r,E) = A(E)\int a(r) + B(E)\int b(r) = A(E)p_a + B(E)p_b \quad \text{(Eqn. 3)}$$

where $p_a$ and $p_b$ are the basis material line integrals.

The set of measurements from Eqn. 1 may thus be rewritten as:

$$I_L = f_L(p_a, p_b)$$

$$I_H = f_H(p_a, p_b) \quad \text{(Eqn. 4)}.$$

The functions $f_L$ and $f_H$ can be determined empirically, based on calibration measurements of different material combinations with spectra $S_L$ and $S_H$, after which $p_a$ and $p_b$ can be computed by inverting the set of equations of Eqn. 4.

In one embodiment, it may be preferred to directly define the inverse functions $g_a$ and $g_b$ from the calibration experiments, resulting in the following material decomposition (MD) step:

$$p_a = g_a(I_L, I_H)$$

$$p_b = g_b(I_L, I_H) \quad \text{(Eqn. 5)}.$$

A reconstruction algorithm is used to reconstruct $a(r)$ and $b(r)$ based on sinograms $p_a$ and $p_b$, respectively. The reconstruction algorithm can be a direct algorithm (such as filtered backprojection) or an iterative algorithm (such as penalized weighted least squares with ordered subsets or iterative coordinate descent). In these cases, the input to the reconstruction algorithm are sinograms $p_a$ and $p_b$ obtained from Eq. 5.

In an alternative, the entire inversion process may be set up as one iterative reconstruction process with unknowns $a(r)$ and $b(r)$, and using as inputs the measurements $I_L$ and $I_H$, and with the forward model given by Eqn. 1.

Embodiments of the invention start from a first reconstruction of the basis materials and improve those reconstructed images by incorporating knowledge of the noise in the measurements and prior knowledge on the images.

Figure 5:
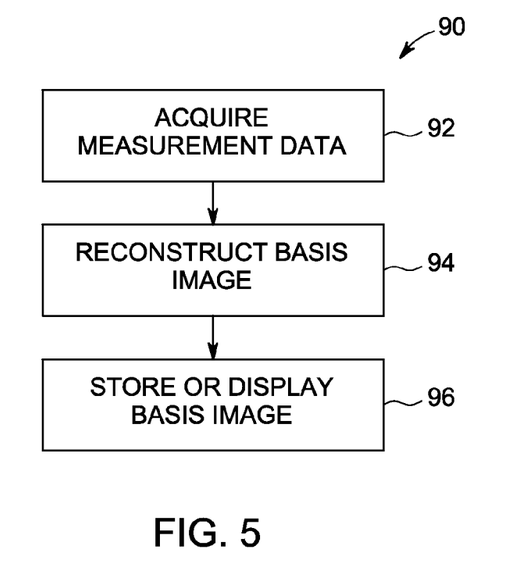
FIG. 5 is a technique for reconstructing a basis material decomposition image according to an embodiment of the invention.

FIG. 5 is a technique 90 for reconstructing a basis image according to an embodiment of the invention. At block 92, measurement data is acquired by an x-ray detector at a plurality of x-ray energy spectra or levels. In one embodiment, detector cells of the x-ray detector may be direct conversion detector cells or single- or dual-layer scintillator detector cells. It is contemplated that two or more mean energies may be used to control the x-ray tube to generate the plurality of x-ray energy spectra. For example, when two mean energies are used, the x-ray tube may be energized to 80 kVp and 140 kVp to acquire two different energy spectra $S_L(E)$ and $S_H(E)$, respectively. Other kVp values, however, are also possible.

A basis image is reconstructed from the acquired measurement data at block 94. In one embodiment, an image reconstructor such as image reconstructor 34 is configured to reconstruct the basis image. At block 96, the basis image may be stored to an image storage or may be displayed to a user.

For many CT exams, some prior knowledge exists on what types of materials can occur in the object or patient. For example, in medical CT, materials expected in an imaging patient may include air, lung, muscle, fat, bone, contrast agent, and perhaps some high-density artificial objects. Since each of these materials and their possible mixtures correspond to specific combinations of the basis materials, there is some prior knowledge on what pairs (a,b) are physically possible. For example, if an image voxel is decomposed into photo-electric effect $\phi$ and Compton scatter effect $\theta$, it is not possible to have a voxel with non-zero $\phi$ and zero $\theta$.

In addition, there is some prior knowledge about the differences between neighboring or adjacent voxels. That is, there is a high probability that neighboring voxels have similar coefficients a and b, except for near the edge of an object. In that case, it is likely that both coefficients change together.

Figure 6:
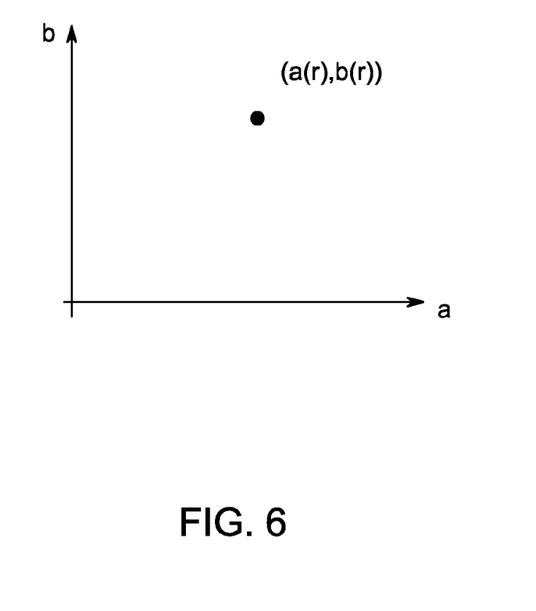
FIG. 6 is a basis material plot illustrating the concentration (a,b) expressing the contribution of two basis materials for a voxel at location r in the reconstructed basis image according to an embodiment of the invention.

Based on prior knowledge of material types as well as on neighboring or adjacent voxels, embodiments of the invention improve material decomposition by considering probabilities based on the prior knowledge. FIG. 6 shows a basis material plot illustrating the concentration of basis materials of a point (a,b) for a voxel at location r in a reconstructed basis image. The basis image can be reconstructed based on a material basis (a,b) of choice. In one embodiment, the basis image may be based in terms of water and iodine, and in another embodiment, the basis image may be based in terms of Compton scatter and photoelectric effects as examples. The basis image results from the sets of measurements $I_L$ and $I_H$ or their corresponding prepped measurements $p_L$ and $p_H$. Hereinbelow, the notation r will not be used in the discussion, but it is to be understood as being included. While embodiments of the invention will be described with respect to two basis materials a and b herein, embodiments of the invention are not limited to such, and more than two basis materials are contemplated.

Figure 7:
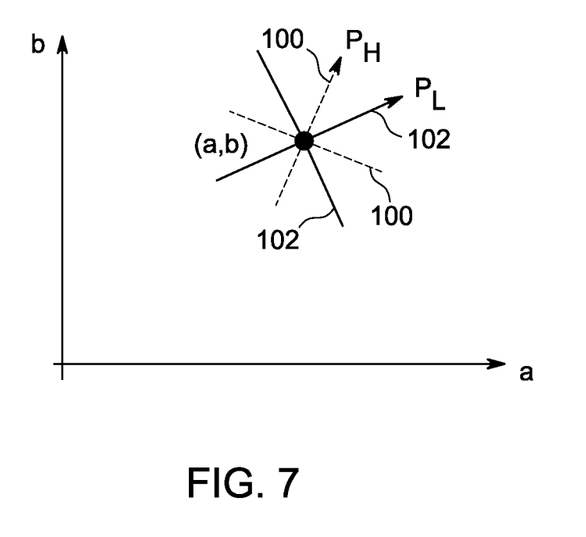
FIG. 7 illustrates linearized dependency of reconstructed basis material coefficients a and b on high and low energy attenuation measurements $p_H$ and $p_L$ according to an embodiment of the invention
Figure 8:
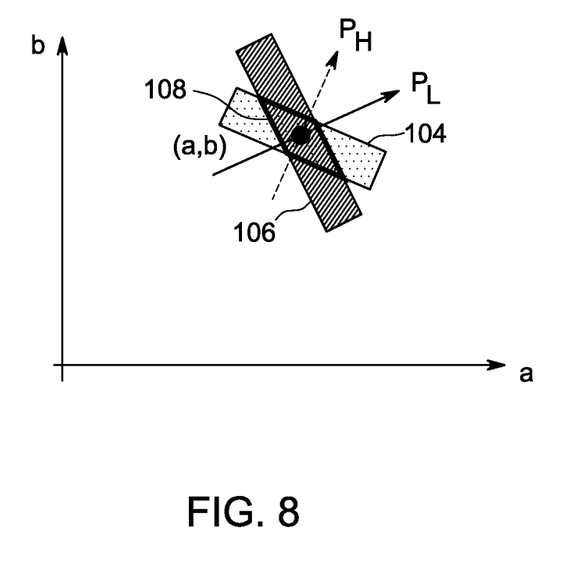
FIG. 8 illustrates random perturbations on $p_H$ and $p_L$ and its impact on the variance of coefficients a and b according to an embodiment of the invention.

Random perturbations on high and low energy attenuation measurements $p_H$ and $p_L$ are considered with respect to FIGS. 7 and 8 according to an embodiment of the invention. The random perturbations may be primarily due to quantum noise and electronic (DAS) noise.

FIG. 7 illustrates the linearized dependency of reconstructed basis material coefficients a and b on high and low energy attenuation measurements $p_H$ and $p_L$. While in general the dependency of a and b on measurements $p_H$ and $p_L$ is very complex and non-linear, the propagation of relatively small noise perturbations can be estimated based on a linearized model. A relatively small increase in $p_H$ will be reflected in a shift in point (a,b) along a direction relative thereto. Similarly, a relatively small increase in $p_L$ will be reflected in a shift in point (a,b) along another direction relative thereto. The directions are defined by the Jacobian of the inversion process, including the material decomposition step and the reconstruction step. The entire inversion step may be expressed as follows:

$$a = h_a(p_L, p_H)$$

$$b = h_b(p_L, p_H) \quad \text{(Eqn. 6)},$$

where $h_a$ and $h_b$ represent the combination of the decomposition process and the reconstruction process, whether they are performed in succession or integrated in one iterative estimation process. The noise propagation model based on a linearization of Eqn. 6 becomes:

$$\sigma_a = \left|\frac{\partial h_a}{\partial p_L}\right|\sigma_L + \left|\frac{\partial h_a}{\partial p_H}\right|\sigma_H \quad \text{(Eqn. 7)}$$

$$\sigma_b = \left|\frac{\partial h_b}{\partial p_L}\right|\sigma_L + \left|\frac{\partial h_b}{\partial p_H}\right|\sigma_H,$$

where $\sigma_a$ and $\sigma_b$ represent the magnitudes (e.g. standard deviations) of the noise on coefficients a and b and where $\sigma_L$ and $\sigma_H$ represent the magnitudes (e.g. standard deviations) of the noise on $p_H$ and $p_L$. The linearized dependency of basis material coefficients a and b on high and low energy attenuation measurements $p_H$ and $p_L$ around point (a,b) is indicated by axes 100, 102 in FIG. 7

FIG. 8 schematically shows random perturbations on $p_H$ and $p_L$ and its impact on the variance on coefficients a and b. A high energy probability (Pr_H(a,b)) 104 may be determined based on the linearized dependency of $p_H$ indicated by axes 100, and a low energy probability (Pr_L(a,b)) 106 may be determined based on the linearized dependency of $p_L$ indicated by axes 102. In one embodiment, high and low energy probabilities 104, 106 may be expressed as the following mathematical formulation:

$$\text{Pr\_H}(a, b) = \exp\left(-\frac{(c_1 a + c_2 b + c_3)^n}{c_4^n}\right) \quad \text{(Eqn. 8)}$$

$$\text{Pr\_L}(a, b) = \exp\left(-\frac{(c_5 a + c_6 b + c_7)^n}{c_8^n}\right),$$

where the coefficients $c_i$ and n depend on the measurement as well as the uncertainty on these measurements. The coefficients are the parameters of the probability distribution of the true p_H or p_L values, given the measured p_H or p_L values, which include random noise perturbations. For n=2, Gaussian measurement distributions would be modeled. Alternatively, a Poisson model or a compound Poisson model could be used.

The area of intersection 108 between high energy probability 104 and low energy probability 106 represents the possible combinations of coefficients a and b based on the probability distributions Pr_H(a,b) and Pr_L(a,b). Mathematically, the product of Pr_H(a,b) and Pr_L(a,b) is the joint probability distribution on (a,b). Even when adding in the knowledge of these probability distributions, the best (maximum likelihood) estimate of a and b would remain unchanged since this is also the most likely solution based on the probability distributions for $p_H$ and $p_L$. Accordingly, introducing one or more types of prior information leads to a maximum a posteriori estimate, which refines the maximum likelihood estimate.

Figure 9:
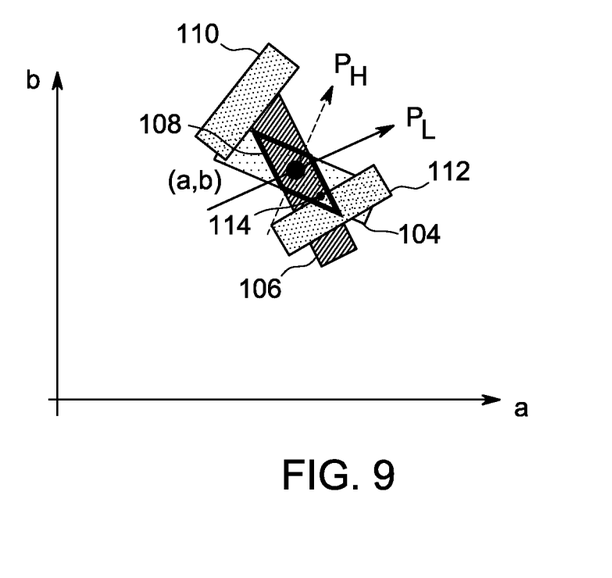
FIG. 9 illustrates prior knowledge on possible physical materials according to an embodiment of the invention

FIG. 9 introduces prior knowledge on possible physical materials according to an embodiment of the invention. A pair of probability distributions Prl(a,b) 110, 112 correspond to areas where true concentrations of a and b in a physical material may actually occur. Accordingly, an intersection of high energy probability 104, low energy probability 106, and probability distribution probability distribution 112 refines the area of possible a and b concentrations to one end of area of intersection 108. The original point (a,b) is thus shifted to the lower-right of area of intersection 108 to a new point 114 where concentrations of a and b correspond to possible physical materials. Since, as shown, area of intersection 108 and probability distribution 110 do not overlap, then there is no probability that point (a,b) would shift to the upper-left of area of intersection 108.

This material prior could for example be expressed as:

$$Pr1(a, b) = \prod_i \exp\left(-\frac{\sqrt{c_1(a-a_i)^2 + c_2(a-a_i)(b-b_i) + c_3(b-b_i)^2}^k}{\rho^k}\right), \quad \text{(Eqn. 9)}$$

where $(a_i, b_i)$ are the coefficients of known materials i and where the exponent k and the standard deviation $\rho$ define the amount and direction of the uncertainty around these operating points. The operating point is defined as the initial reconstructed values (a,b). This prior can be generalized for mixtures of different materials, including formulas such as equation (8) and (9).

Figure 10:
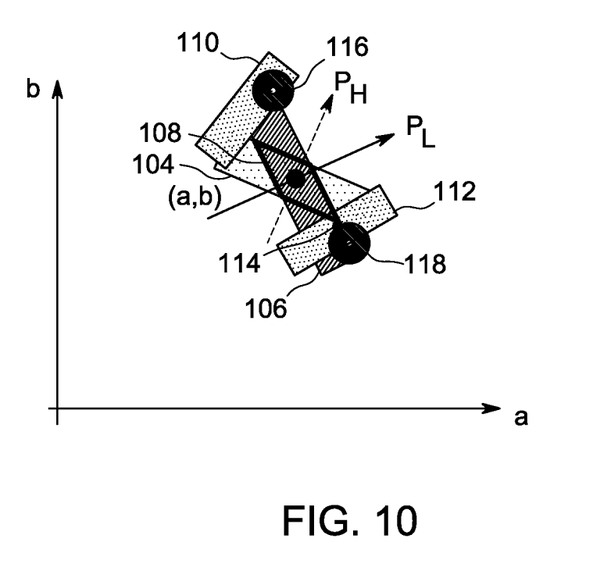
FIG. 10 illustrates prior knowledge on neighboring or adjacent voxel estimates according to an embodiment of the invention.

FIG. 10 introduces prior knowledge on neighboring or adjacent voxel estimates according to an embodiment of the invention. Based on at least a first-pass reconstruction of material decomposition, an estimate of the value of two neighboring voxels is known. An additional prior probability may be defined based on the difference between neighboring voxels. A pair of difference probability distributions Pr2(a,b) 116, 118 correspond to the defined differences.

The difference probability distributions 116, 118 or neighborhood prior may be defined as a Markov Random Field Gibbs prior:

$$Pr2(a, b) = \prod_j \exp\left(-\frac{(a-a_j)^k}{\rho^k} - \frac{(a-a_j)^l(b-b_j)^m}{\sigma^{l+m}} - \frac{(b-b_j)^n}{\tau^n}\right), \quad \text{(Eqn. 10)}$$

where $(a_j, b_j)$ are the coefficients of neighboring voxels j and where the exponents k, l, m, n and the standard deviations $\rho$, $\sigma$, $\tau$ define the amount and direction of the uncertainty around these operating points. The exponents k and standard deviations $\rho$ of Eqns. 9 and 10 may be independent of one another. As shown in FIG. 10, point 114 has shifted even more with respect to its position within FIG. 9.

FIGS. 6-10 and Eqns. 6-10 presented above describe a number of prior probability distributions and mathematical expressions contemplated for embodiments of the invention. Besides the mathematical expressions listed above, other mathematical expressions are possible. In addition, the probabilities could be expressed numerically (e.g., such as based on histograms). Embodiments of the invention include computing or determining a final image that maximizes the combined probabilities. The probabilities may be combined and maximized based on the cost function:

$$\underset{a,b}{\mathrm{argmax}}[Pr\_H(a, b) \cdot Pr\_L(a, b) \cdot Pr1(a, b) \cdot Pr2(a, b)]. \quad \text{(Eqn. 11)}$$

Figure 11:
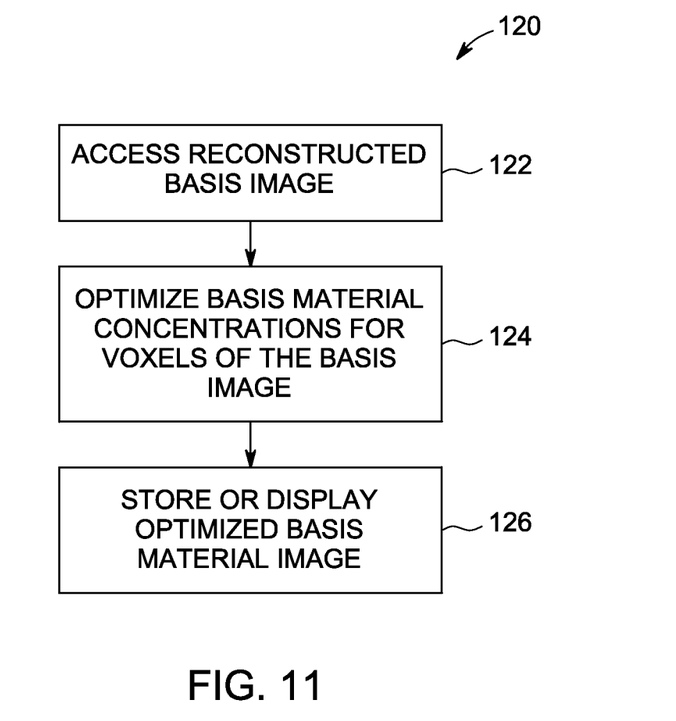
FIG. 11 is a material decomposition technique according to an embodiment of the invention.

FIG. 11 is a material decomposition technique 120 according to an embodiment of the invention. At block 122, a reconstructed basis material or multi-spectral image is accessed or obtained. In one embodiment, the reconstructed basis image may be an image resulting from block 94 of technique 90. In another embodiment, the reconstructed basis image may be obtained from an image storage database. Each voxel of the reconstructed basis image includes values of each basis material.

At block 124, the basis material concentrations for the voxels of the reconstructed basis image are optimized. Optimization is performed exclusively or entirely in the image domain and may be performed using Eqn. 11. In one example, a gradient-based optimization is performed where, starting from the current image estimate, repeated optimization steps are made in the direction of the gradient of the above cost function (Eqn. 11), while re-computing the gradient after each step based on the new image estimate. In another example, an iterative coordinate optimization is performed where, for one voxel at a time, an optimal value for that voxel is computed or determined. Both gradient-based optimization and iterative coordinate optimization approaches may vary in terms of the computational complexity per iteration, the number of iterations required to convergence, and the suitability for hardware implementation. Accordingly, the optimization approach used may be tailored to an individual imaging system or scan session. While the cost function illustrated in Eqn. 11 includes maximizing based on the combined probabilities of Pr_H(a,b), Pr_L(a,b), Pr1(a,b), and Pr2(a,b), a cost function based on one or more of any of the probabilities of Pr_H(a,b), Pr_L(a,b), Pr1(a,b), and Pr2(a,b) is contemplated.

After the optimization at block 124, a final, optimized basis material or multi-spectral image may be stored to an image storage or may be displayed to a user at block 126.

Figure 12:
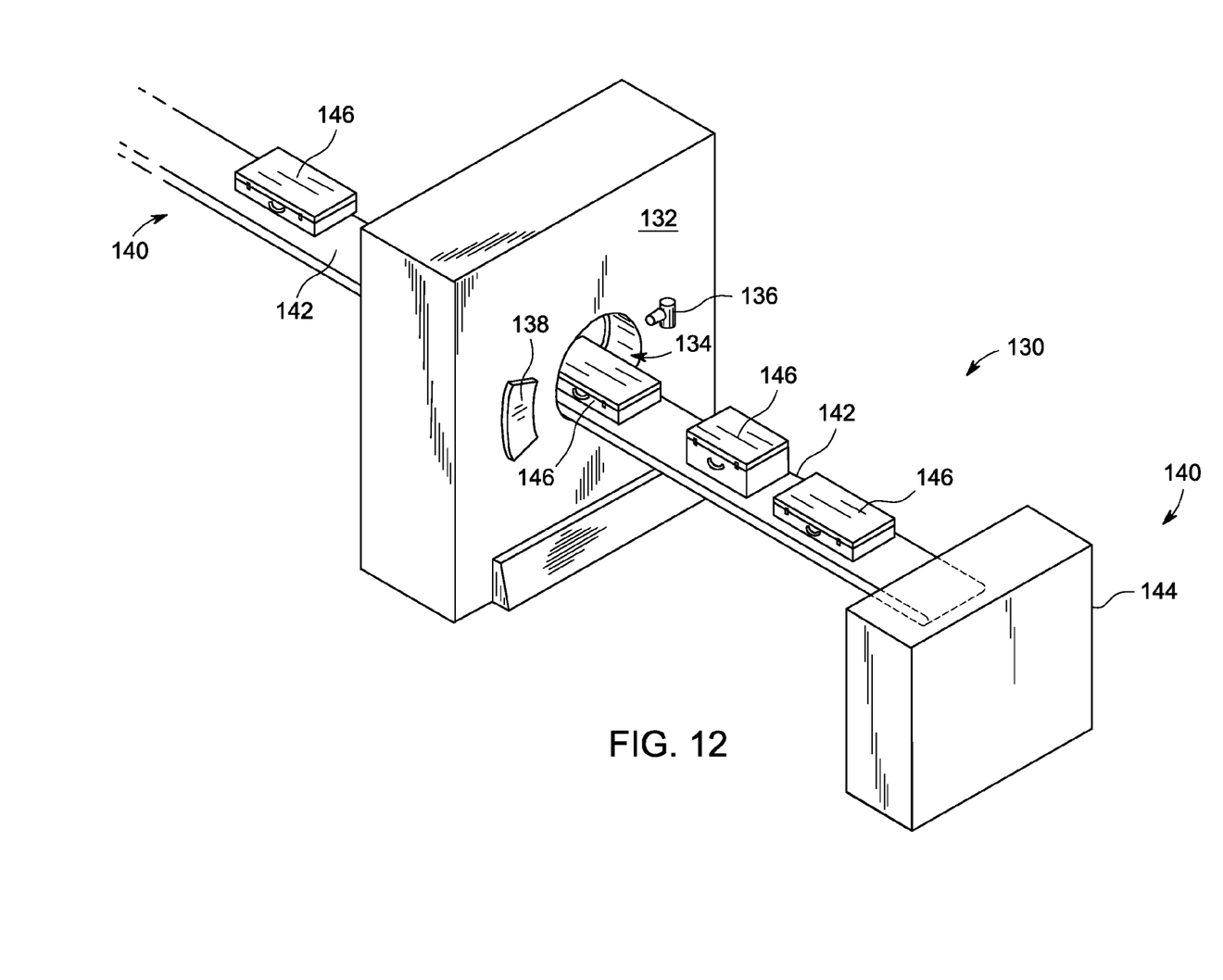
FIG. 12 is a pictorial view of a CT system for use with a non-invasive package inspection system.

Referring now to FIG. 12, package/baggage inspection system 130 includes a rotatable gantry 132 having an opening 134 therein through which packages or pieces of baggage may pass. The rotatable gantry 132 houses a high frequency electromagnetic energy source 136 as well as a detector assembly 138 having scintillator arrays comprised of scintillator cells. A conveyor system 140 is also provided and includes a conveyor belt 142 supported by structure 144 to automatically and continuously pass packages or baggage pieces 146 through opening 134 to be scanned. Objects 146 are fed through opening 134 by conveyor belt 142, imaging data is then acquired, and the conveyor belt 142 removes the packages 146 from opening 134 in a controlled and continuous manner. As a result, postal inspectors, baggage handlers, and other security personnel may non-invasively inspect the contents of packages 146 for explosives, knives, guns, contraband, etc.

A technical contribution for the disclosed method and apparatus is that is provides for a computer implemented system and method of material decomposition optimization in the image domain.

One skilled in the art will appreciate that embodiments of the invention may be interfaced to and controlled by a computer readable medium having stored thereon a computer program. The computer readable medium includes a plurality of components such as one or more of electronic components, hardware components, and/or computer software components. These components may include one or more computer readable media that generally stores instructions such as software, firmware and/or assembly language for performing one or more portions of one or more implementations or embodiments of a sequence. These computer readable media are generally non-transitory and/or tangible. Examples of such a computer readable medium include a recordable data medium of a computer and/or storage device. The computer readable media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to an embodiment of the invention, a non-transitory computer readable medium has stored thereon a sequence of instructions which, when executed by a computer, causes the computer to access a reconstructed basis material image. For a first voxel of the reconstructed basis material image, the instructions also cause the computer to optimize a concentration of a pair of materials (a,b) in the first voxel exclusively in the image domain and based on a first probability based on random perturbations and a second probability based on random perturbations. The optimization is further based on a third probability based on known materials and a fourth probability based on concentrations of the pair of materials in a pair of voxels neighboring the first voxel.

According to another embodiment of the invention, a method comprises selecting a first voxel of a reconstructed multi-spectral image, the first voxel comprising a concentration of a first material (a) and a concentration of a second material (b). The method also comprises optimizing the concentrations of the first and second materials entirely in the imaging domain based on a first random perturbation probability (Pr_H(a,b)), a second random perturbation probability (Pr_L(a,b)), a known material probability (Pr1(a,b)), and a neighboring voxel probability (Pr2(a,b)) based on concentrations of the first and second materials in a second of voxel and in a third voxel, wherein the second and third voxels are adjacent to the first voxel.

According to yet another embodiment of the invention, a CT system comprises a rotatable gantry having an opening to receive an object to be scanned, a high frequency electromagnetic energy projection source configured to project a high frequency electromagnetic energy beam toward the object, and a detector configured to detect high frequency electromagnetic energy passing through the object, wherein the detector comprises a plurality of detector cells configured to output signals indicative of the detected high frequency electromagnetic energy. A data acquisition system (DAS) is connected to the detector and is configured to receive the output signals, and an image reconstructor is connected to the DAS and is configured to reconstruct an image of the object from the output signals received by the DAS. The CT system also comprises a computer programmed to cause the image reconstructor to reconstruct a basis material image from multi-energy data output to the DAS from the detector and, only in the image domain, to optimize a concentration of a plurality of materials (a,b) in each of a plurality of voxels of the reconstructed basis material image based on a pair of random perturbation probabilities, based on a possible physical material probability, and based on a neighboring voxel probability of concentrations of the pair of materials in a plurality of voxels neighboring the voxel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A non-transitory computer readable medium having stored thereon a sequence of instructions which, when executed by a computer, causes the computer to:
    access a reconstructed basis material image;
    for a first voxel of the reconstructed basis material image, optimize a concentration of a pair of materials (a,b) in the first voxel exclusively in the image domain and based on:
        a first probability based on random perturbations;
        a second probability based on random perturbations;
        a third probability based on known materials; and
        a fourth probability based on concentrations of the pair of materials in a pair of voxels neighboring the first voxel.

2. The computer readable medium of claim 1 wherein the sequence of instructions that causes the computer to optimize the concentration of the pair of materials causes the computer to optimize the concentration of the pair of materials based on a maximization of a combination of the first, second, third, and fourth probabilities.

3. The computer readable medium of claim 1 wherein the sequence of instructions further causes the computer to determine the first probability based on the equation:

$$\text{Pr\_H}(a, b) = \exp\left(-\frac{(c_1 a + c_2 b + c_3)^n}{c_4^n}\right),$$

where the coefficients $c_i$ and n depend on the measurement as well as the uncertainty on these measurements.

4. The computer readable medium of claim 1 wherein the sequence of instructions further causes the computer to determine the second probability based on the equation:

$$\text{Pr\_L}(a, b) = \exp\left(-\frac{(c_5 a + c_6 b + c_7)^n}{c_8^n}\right),$$

where the coefficients $c_i$ and n depend on the measurement as well as the uncertainty on these measurements.

5. The computer readable medium of claim 1 wherein the sequence of instructions further causes the computer to determine the third probability based on the equation:

$$Pr1(a, b) = \prod_i \exp\left(-\frac{\sqrt{c_1(a-a_i)^2 + c_2(a-a_i)(b-b_i) + c_3(b-b_i)^2}}{\rho^k}\right)^k,$$

where $(a_i, b_i)$ are the coefficients of known materials i and where the exponent k and the standard deviation $\rho$ define the amount and direction of the uncertainty around these operating points.

6. The computer readable medium of claim 1 wherein the sequence of instructions further causes the computer to determine the fourth probability based on the equation:

$$Pr2(a, b) = \prod_j \exp\left(-\frac{(a-a_j)^k}{\rho^k} - \frac{(a-a_j)^l(b-b_j)^m}{\sigma^{l+m}} - \frac{(b-b_j)^n}{\tau^n}\right),$$

where $(a_j, b_j)$ are the coefficients of neighboring voxels j and where the exponents k, l, m, n and the standard deviations $\rho$, $\sigma$, $\tau$ define the amount and direction of the uncertainty around these operating points.

7. The computer readable medium of claim 1 wherein the sequence of instructions further causes the computer, for a second voxel of the reconstructed basis material image, to optimize a concentration of a pair of materials (a,b) in the second voxel exclusively in the image domain and based on:
  a fifth probability based on random perturbations;
  a sixth probability based on random perturbations;
  a seventh probability based on known materials; and
  an eighth probability based on concentrations of the pair of materials in a pair of voxels neighboring the second voxel.

8. The computer readable medium of claim 7 wherein the sequence of instructions further causes the computer to optimize the concentrations of the pairs of materials (a,b) in the first and second voxels using a gradient-based optimization where, starting from a current image estimate, repeated optimization steps are made in the direction of the gradient of a cost function incorporating the first, second, third, and fourth probabilities, and where the gradient after each step is re-computed based on a new image estimate.

9. The computer readable medium of claim 7 wherein the sequence of instructions further causes the computer to optimize the concentrations of the pairs of materials (a,b) in the first and second voxels using an iterative coordinate optimization where, for one voxel at a time, an optimal value for that voxel is determined.

10. The computer readable medium of claim 1 wherein the sequence of instructions further causes the computer to generate the reconstructed basis material image from a plurality of acquired multi-spectral x-ray data.

11. A method comprising:
  selecting a first voxel of a reconstructed multi-spectral image, the first voxel comprising:
    a concentration of a first material (a); and
    a concentration of a second material (b); and
  optimizing the concentrations of the first and second materials entirely in the imaging domain based on:
    a first random perturbation probability (Pr_H(a,b));
    a second random perturbation probability (Pr_L(a,b));
    a known material probability (Pr1(a,b)); and
    a neighboring voxel probability (Pr2(a,b)) based on concentrations of the first and second materials in a second of voxel and in a third voxel, wherein the second and third voxels are adjacent to the first voxel.

12. The method of claim 11 wherein:

$$Pr\_H(a, b) = \exp\left(-\frac{(c_1 a + c_2 b + c_3)^n}{c_4^n}\right),$$

where the coefficients $c_i$ and n depend on the measurement as well as the uncertainty on these measurements.

13. The method of claim 11 wherein:

$$Pr\_L(a, b) = \exp\left(-\frac{(c_5 a + c_6 b + c_7)^n}{c_8^n}\right),$$

where the coefficients $c_i$ and n depend on the measurement as well as the uncertainty on these measurements.

14. The method of claim 11 wherein:

$$Pr1(a, b) = \prod_i \exp\left(-\frac{\sqrt{c_1(a-a_i)^2 + c_2(a-a_i)(b-b_i) + c_3(b-b_i)^2}^k}{\rho^k}\right),$$

where $(a_i, b_i)$ are the coefficients of known materials i and where the exponent k and the standard deviation $\rho$ define the amount and direction of the uncertainty around these operating points.

15. The method of claim 11 wherein:

$$Pr2(a, b) = \prod_j \exp\left(-\frac{(a-a_j)^k}{\rho^k} - \frac{(a-a_j)^l(b-b_j)^m}{\sigma^{l+m}} - \frac{(b-b_j)^n}{\tau^n}\right),$$

where $(a_j, b_j)$ are the coefficients of neighboring voxels j and where the exponents k, l, m, n and the standard deviations $\rho$, $\sigma$, $\tau$ define the amount and direction of the uncertainty around these operating points.

16. A CT system comprising:
  a rotatable gantry having an opening to receive an object to be scanned;
  a high frequency electromagnetic energy projection source configured to project a high frequency electromagnetic energy beam toward the object;
  a detector configured to detect high frequency electromagnetic energy passing through the object, wherein the detector comprises a plurality of detector cells configured to output signals indicative of the detected high frequency electromagnetic energy;
  a data acquisition system (DAS) connected to the detector and configured to receive the output signals;
  an image reconstructor connected to the DAS and configured to reconstruct an image of the object from the output signals received by the DAS; and
  a computer programmed to:
    cause the image reconstructor to reconstruct a basis material image from multi-energy data output to the DAS from the detector; and
    only in the image domain, optimize a concentration of a plurality of materials (a,b) in each of a plurality of voxels of the reconstructed basis material image based on a pair of random perturbation probabilities, based on a possible physical material probability, and based on a neighboring voxel probability of concentrations of the pair of materials in a plurality of voxels neighboring the voxel.

17. The CT system of claim 16 wherein the computer, in being programmed to optimize the concentration of the plurality of materials in each of a plurality of voxels, is programmed to optimize the concentration based on a cost function:

$$\underset{a,b}{\mathrm{argmax}}[\mathrm{Pr\_H}(a,b) \cdot \mathrm{Pr\_L}(a,b) \cdot Pr1(a,b) \cdot Pr2(a,b)],$$

where:

$$\mathrm{Pr\_H}(a,b) = \exp\left(-\frac{(c_1 a + c_2 b + c_3)^n}{c_4^n}\right),$$

$$\mathrm{Pr\_L}(a,b) = \exp\left(-\frac{(c_5 a + c_6 b + c_7)^n}{c_8^n}\right),$$

$$Pr1(a,b) = \prod_i \exp\left(-\frac{\sqrt{c_1(a-a_i)^2 + c_2(a-a_i)(b-b_i) + c_3(b-b_i)^2}^k}{\rho^k}\right),$$

and $$Pr2(a,b) = \prod_j \exp\left(-\frac{(a-a_j)^k}{\rho^k} - \frac{(a-a_j)^l(b-b_j)^m}{\sigma^{l+m}} - \frac{(b-b_j)^n}{\tau^n}\right);$$

where the coefficients $c_i$ and n depend on the measurement as well as the uncertainty on these measurements;

where $(a_j, b_j)$ are the coefficients of neighboring voxels j; and where the exponents k, l, m, n and the standard deviations $\rho, \sigma, \tau$ define the amount and direction of the uncertainty around respective operating points.

18. The CT system of claim 16 wherein the computer is further programmed to:

cause the high frequency electromagnetic energy projection source to project the high frequency electromagnetic energy beam at a pair of distinct mean energies; and cause the detector to acquire the high frequency electromagnetic energy beam at the pair of distinct mean energies.

19. The CT system of claim 16 wherein the detector comprises one of direct conversion detector cells, single-layer scintillator detector cells, and dual-layer scintillator detector cells.

20. The CT system of claim 16 wherein the computer, in being programmed to optimize the concentration of a plurality of materials (a,b), is programmed to optimize the concentration of water and iodine.

\* \* \* \* \*